Figure 1:
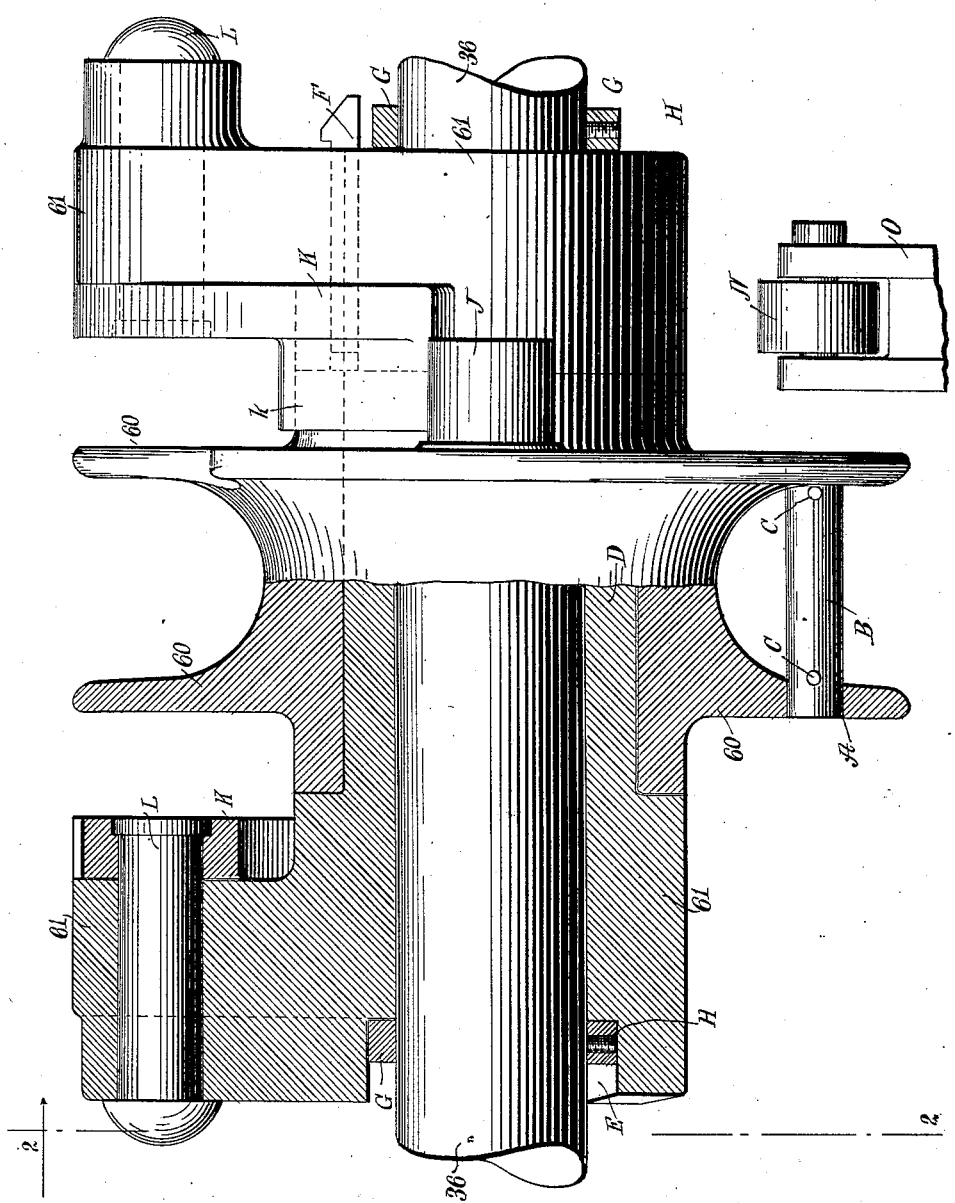

H. H. HAIGHT.
TRIP MECHANISM FOR WELL SINKING MACHINES.
APPLICATION FILED APR. 19, 1911.

999,026.

Patented July 25, 1911.

2 SHEETS—SHEET 1.

WITNESSES:

INVENTOR
Hiram H. Haight
BY
ATTORNEYS

H. H. HAIGHT.
TRIP MECHANISM FOR WELL SINKING MACHINES.
APPLICATION FILED APR. 19, 1911.
999,026.
Patented July 25, 1911.
2 SHEETS—SHEET 2.
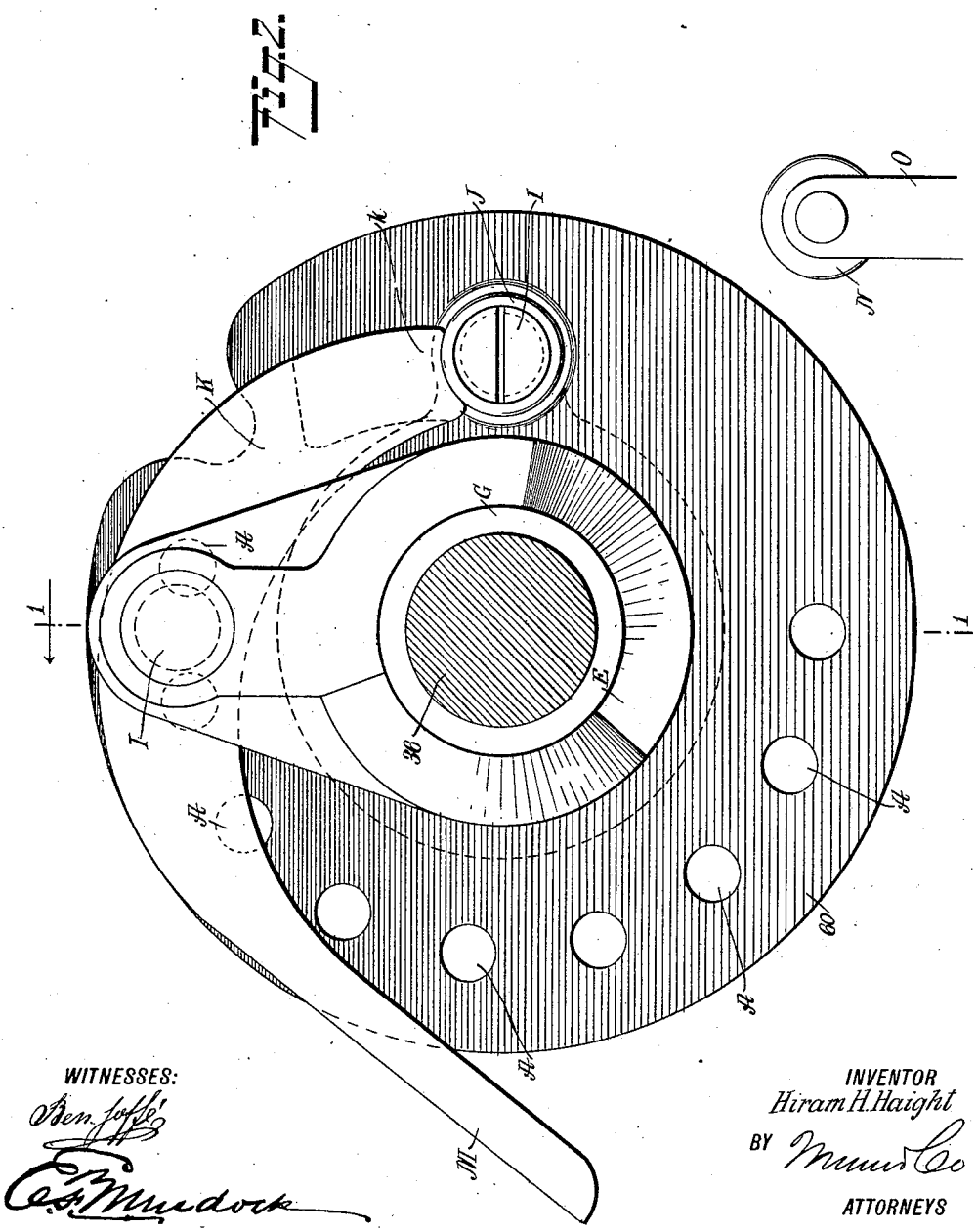
WITNESSES:
INVENTOR
Hiram H. Haight
BY
ATTORNEYS

UNITED STATES PATENT OFFICE.

HIRAM H. HAIGHT, OF WINNEBAGO, MINNESOTA.

TRIP MECHANISM FOR WELL-SINKING MACHINES.

999,026.  Specification of Letters Patent.  Patented July 25, 1911.

Application filed April 19, 1911. Serial No. 622,096.

*To all whom it may concern:*

Be it known that I, HIRAM H. HAIGHT, a citizen of the United States, and a resident of Winnebago, in the county of Faribault and State of Minnesota, have invented a new and Improved Trip Mechanism for Well-Sinking Machines, of which the following is a full, clear, and exact description.

Among the principal objects which the present invention has in view are: to provide a mechanism for use in conjunction with the jerk line or drop cable used in a machine of the character specified; to provide a pulley for the said cable arranged to regulate the extent of the take-up of said cable; and to provide a construction for the said pulley and the mounting therefor which is durable, simple and efficient.

One embodiment of the present invention is disclosed in the structure illustrated in the accompanying drawings, in which like characters of reference denote corresponding parts in both the views, and in which—

Figure 1 is a side elevation of a trip mechanism constructed in accordance with the present invention, the view being shown partly in section taken on the line 1—1 in Fig. 2; and Fig. 2 is a side view of the hoisting pulley and trip mechanism therefor, showing the driving shaft of the machine in section, the view being taken on the line 2—2 in Fig. 1.

A trip mechanism constructed in accordance with the present invention is used in conjunction with the well boring mechanism described and illustrated in an application for patent filed by me the 11th day of May, 1911, and bearing Number 626,524, to which cross reference is here made. In the above mentioned application it will be seen that a flexible jerk line or hoisting cable is used for the purpose of reciprocating or elevating and dropping the boring and drilling tools connected therewith. The pulley to which the said cable is connected is herein shown and designated by the numeral 60. The pulley 60 is provided with a suitable guide groove, the sides whereof are perforated to provide a series of perforations A, A. The perforations A, A are provided to support an anchoring pin B, which pin is extended between the flanges and held in the perforations therein by set pins C, C. The pulley 60 is loosely mounted on a bearing D formed on one of the sections of the housing 61. The housing 61 is loosely mounted upon the driving shaft 36, and is parted, the larger section forming the bearing D for the pulley 60 and having formed in the face of the end removed from the said pulley a series of clutch teeth E. The opposite and smaller section of the housing 61 is slipped over the extension of the bearing D and fixedly connected therewith by a driving key F, keyways being formed in both sections to receive the said key. The housing 61 is secured from shifting on the shaft 36 by set collars G, G.

Extended from the sides of the pulley 60 are pins I, I, upon which are mounted rollers J, J. The rollers J, J form a sliding bearing to receive the ends of trip levers K, K, as shown in the drawings. The levers K, K are pivotally mounted upon pins L, L, fixedly mounted in the opposite sections of the housing 61. The levers K, K are provided with tail pieces M, M. The tail pieces M, M are extended beyond the periphery of the flanges of the pulley 60, as shown in Fig. 2 of the drawings. Fixedly mounted upon the stationary structure on which the shaft 36 is mounted are rollers N, N, rotatively mounted in standards O, O, and interposed in the rotary path of the levers K, K, and directly in the path of the tail pieces, M, M. When in the rotation of the pulley 60 the tail pieces M, M impinge upon the rollers N, N, the said tail pieces are deflected toward the center of the shaft 36 until the noses $k$, $k$ of the levers K, K are lifted out of engagement with the pins I, I. It will be noticed that the levers K, K are disposed to one side of the rollers J, J on the pins I, I to permit the passage of the said rollers and pins between the pulley 60 and the face of the said levers K. This construction provides for the passage of the rollers J when the noses $k$ are lifted out of engagement with the said rollers and the pins I.

The pulley 60 is rotated by the engagement of the levers K, K with the said pulley, and when thus engaged the strain of the jerk line or hoisting cable is upon the said pulley. When the levers K, K are removed from engagement with the said pulley, the strain of the said cable retracts the said pulley, placing the pins I and their rollers J in the path of the said levers K, as and when the shaft 36 is rotated to present the said levers K to reëngage the said pins I. This alternate engagement and release by the shaft 36 and the housing 61 thereon, with the pulley 60, produces a rapid hoisting and dropping of the well forming tools connected with the said pulley.

The extent of the wind of the cable upon the pulley is regulated by the adjustment of the pin B in the series of perforations A. It will be seen that when the pulley 60 is released from engagement with the levers K, the cable to which it is attached will retract the pulley until the perforations A carrying the pin B to which the cable is then attached are in a location vertically above the center of the shaft 36. If the pin B be placed in the first of the series of the perforations A the effect on the cable will be to wind a greater amount of the same upon the said pulley before the pulley is released by the levers K, K.

Having thus described my invention, what I claim as new and desire to secure by Letters Patent is:—

1. A trip mechanism for well sinking machines, comprising a driving shaft; a housing rotatively mounted on said driving shaft adapted to be engaged therewith; a winding pulley rotatively mounted on said housing; engaging devices for fixedly connecting said housing and said pulley; and releasing devices fixedly mounted in the path of said engaging devices to release the said pulley from the said housing.

2. A trip mechanism for well sinking machines, comprising a driving shaft; a housing rotatively mounted on said shaft and adapted to be fixedly engaged therewith; a winding pulley rotatively mounted on said housing and provided with means for attaching the hoisting cable, said means being disposed in serial relation to regulate the amount of cable wound by the rotation of said pulley; engaging devices for fixedly connecting said housing and said pulley; and releasing devices fixedly mounted in the path of said engaging devices to release the said pulley from said housing.

3. A trip mechanism for well sinking machines, comprising a driving shaft; a housing rotatively mounted on said shaft and adapted to be engaged therewith; guides fixedly attached to said shaft for securing the said housing thereon; a pulley rotatively mounted on said housing, said pulley having extended flanges provided with perforations serially arranged therein; an anchoring pin for securing the hoisting cable to said pulley, said pin being adapted for insertion at will in any of the said perforations; engaging devices for fixedly connecting said housing and said pulley; and releasing devices fixedly mounted in the path of said engaging devices to release the said pulley from said housing.

4. A trip mechanism for well sinking machines, comprising a driving shaft; a housing rotatively mounted on said shaft and adapted to be engaged therewith; means for guiding the said housing on said shaft; a winding pulley rotatively mounted on said housing having an engaging member in the side thereof; a rocking arm pivotally mounted on said housing adapted to engage the said engaging member on said pulley; and an interference member fixedly mounted in the path of said rocking arm to impinge upon the same to raise the said arm from engagement with the said engaging member.

5. A trip mechanism for well sinking machines, comprising a driving shaft; a housing rotatively mounted on said shaft to be fixedly engaged therewith; a winding pulley rotatively mounted on said housing; an engaging pin mounted on the side of said pulley and extended therefrom; a rocking lever pivotally mounted on said housing, having a nose adapted to impinge upon said pin and provided with a tail piece extended beyond the rotary path of said pin; and a fixed interference member located in the path of said tail piece to impinge upon the same to raise the said nose out of engagement with said pin.

6. A trip mechanism for well sinking machines, conprising a driving shaft; a housing rotatively mounted on said shaft to be fixedly engaged therewith; a winding pulley rotatively mounted on said housing and having extended flanges perforated at regular intervals; a securing pin adapted to be secured in each of the said perforations; a plurality of engaging pins extended from the sides of said pulley; a plurality of engaging levers pivotally mounted on said housing, each having a head to engage the said pins, and each provided with a tail piece extended beyond the rotary path of said pins; and a plurality of interference members fixedly mounted and located in the path of said tail pieces to deflect the said levers to remove the same from engagement with said pins.

In testimony whereof I have signed this specification in the presence of two subscribing witnesses.

HIRAM H. HAIGHT.

Witnesses:
HARRY G. SIVERSON,
IRA A. BABCOCK.

---

Copies of this patent may be obtained for five cents each, by addressing the "Commissioner of Patents, Washington, D. C."